(12) United States Patent
Fink et al.

(10) Patent No.: US 10,569,745 B2
(45) Date of Patent: Feb. 25, 2020

(54) DEVICE FOR DETACHABLY LINKING A WIPER BLADE TO A DRIVEN WIPER ARM

(71) Applicants: Valeo North America, Inc., Troy, MI (US); Delmex de Juarez S. de R.L. de C.V., Juarez Ciudad (MX)

(72) Inventors: Andreas Fink, Grossbottwar (DE); Wolfgang Scholl, Gemmrigheim (DE); Gerhard Schremmer, Bietigheim-Bissingen (DE)

(73) Assignees: Valeo North America, Inc., Troy, MI (US); Delmex de Juarez S. de R.L. de C.V., Juarez Ciudad (MX)

( * ) Notice: Subject to any disclaimer, the term of this patent is extended or adjusted under 35 U.S.C. 154(b) by 0 days.

(21) Appl. No.: 16/251,927

(22) Filed: Jan. 18, 2019

(65) Prior Publication Data

US 2019/0152446 A1 May 23, 2019

Related U.S. Application Data

(60) Continuation of application No. 15/948,375, filed on Apr. 9, 2018, now Pat. No. 10,259,429, which is a
(Continued)

(30) Foreign Application Priority Data

Nov. 26, 2002 (DE) .................................. 102 54 978
May 27, 2003 (DE) .................................. 103 23 997

(51) Int. Cl.
*B60S 1/40* (2006.01)
*B60S 1/38* (2006.01)
*B60S 1/42* (2006.01)

(52) U.S. Cl.
CPC ............... *B60S 1/4048* (2013.01); *B60S 1/38* (2013.01); *B60S 1/381* (2013.01); *B60S 1/3849* (2013.01);
(Continued)

(58) Field of Classification Search
CPC .... B60S 1/3868; B60S 1/3849; B60S 1/4038; B60S 1/4045; B60S 1/4048;
(Continued)

(56) References Cited

U.S. PATENT DOCUMENTS 1,852,779 A  4/1932  Hueber
2,153,224 A  12/1934  Zaiger
(Continued)

FOREIGN PATENT DOCUMENTS

DE  1089649  9/1960
DE    77904  11/1970
(Continued)

OTHER PUBLICATIONS

Machine translation of description portion of WO publication 02/40328, published May 2002 (Year: 2002).*
(Continued)

*Primary Examiner* — Gary K. Graham
(74) *Attorney, Agent, or Firm* — Oblon, McClelland, Maier & Neustadt, L.L.P.

(57) ABSTRACT

A wiper blade assembly for a windshield wiper. In one embodiment, the wiper blade assembly includes a connector mounted on a blade support element. The connector has a receiving portion shaped to receive a first part of the end portion of a wiper arm and further has a securing portion shaped to secure a second part of the end portion of the wiper arm.

20 Claims, 6 Drawing Sheets

Related U.S. Application Data continuation of application No. 15/664,487, filed on Jul. 31, 2017, now Pat. No. 9,969,361, which is a continuation of application No. 15/332,736, filed on Oct. 24, 2016, now Pat. No. 9,751,503, which is a continuation of application No. 14/853,487, filed on Sep. 14, 2015, now Pat. No. 9,499,132, which is a continuation of application No. 13/531,788, filed on Jun. 25, 2012, now Pat. No. 9,162,650, which is a division of application No. 12/944,776, filed on Nov. 12, 2010, now Pat. No. 8,220,106, which is a continuation of application No. 10/536,054, filed as application No. PCT/EP03/13062 on Nov. 21, 2003, now Pat. No. 7,891,044.

(52) U.S. Cl.
CPC .......... *B60S 1/3853* (2013.01); *B60S 1/3858* (2013.01); *B60S 1/4038* (2013.01); *B60S 1/42* (2013.01); *B60S 1/3863* (2013.01); *B60S 1/3868* (2013.01); *B60S 1/4045* (2013.01); *B60S 2001/4051* (2013.01); *B60S 2001/4054* (2013.01); *Y10T 29/49* (2015.01)

(58) Field of Classification Search
CPC ...... B60S 2001/4051; B60S 2001/4054; B60S 2001/4058
USPC ..................................................... 15/250.32
See application file for complete search history.

(56) References Cited

U.S. PATENT DOCUMENTS

| | | |
|---|---|---|
| 2,031,297 A | 2/1936 | Anderson |
| 2,073,157 A | 3/1937 | Kempel |
| 2,095,396 A | 10/1937 | Nielsen |
| 2,127,142 A | 8/1938 | Rodrick |
| 2,147,113 A | 2/1939 | Smulski |
| 2,153,225 A | 4/1939 | Zaiger |
| 2,172,928 A | 9/1939 | Anderson |
| 2,206,343 A | 7/1940 | Zaiger |
| 2,234,791 A | 3/1941 | Zaiger |
| 2,260,905 A | 10/1941 | Horton |
| 2,276,556 A | 3/1942 | Zaiger |
| 2,353,208 A | 7/1944 | Whitted |
| 2,508,056 A | 5/1950 | Zaiger |
| 2,618,806 A | 11/1952 | MacPherson |
| 2,632,195 A | 3/1953 | Nesson |
| 2,632,907 A | 3/1953 | Anderson |
| 2,632,908 A | 3/1953 | Krohm |
| 2,632,909 A | 3/1953 | Krohm |
| 2,642,613 A | 6/1953 | Krohm |
| 2,761,168 A | 9/1956 | Krohm |
| 2,761,169 A | 9/1956 | Krohm |
| 2,798,244 A | 7/1957 | Nesson |
| 2,956,299 A | 10/1960 | Ziegler |
| 2,965,914 A | 12/1960 | Anderson |
| 3,147,508 A | 9/1964 | Glynn |
| 3,254,358 A | 6/1966 | Wise |
| 3,405,419 A | 10/1968 | Charlton |
| 3,576,044 A | 4/1971 | Besnard |
| 3,626,544 A | 12/1971 | Lopez et al. |
| 3,757,377 A | 9/1973 | Hayhurst |
| 3,772,730 A | 11/1973 | Plisky |
| 3,808,630 A | 5/1974 | Ito |
| 3,837,033 A | 9/1974 | Van Den Berg |
| 3,864,783 A | 2/1975 | Arman |
| 3,900,916 A | 8/1975 | Wubbe |
| 3,961,394 A | 6/1976 | Steger |
| 4,120,069 A | 10/1978 | Sharp et al. |
| 4,293,974 A | 10/1981 | Gowans |
| 4,348,782 A | 9/1982 | Fournier |
| 4,360,942 A | 11/1982 | Dal Palu |
| 4,429,431 A | 2/1984 | Graczyk |
| 4,445,249 A | 5/1984 | Harbison et al. |
| 5,301,383 A | 4/1994 | Suzuki |
| 5,862,567 A | 1/1999 | Kim |
| 5,894,626 A | 4/1999 | Edele |
| 6,158,079 A | 12/2000 | Shibata |
| 6,449,797 B1 | 9/2002 | De Block |
| 6,481,044 B1 | 11/2002 | Journee |
| 6,530,111 B1 | 3/2003 | Kotlarski |
| 6,553,607 B1 | 4/2003 | De Block |
| 6,594,854 B1 | 7/2003 | Matsumoto et al. |
| 6,622,339 B1 | 9/2003 | Zimmer |
| 6,634,056 B1 | 10/2003 | De Block |
| 6,654,983 B1 | 12/2003 | Raynaud |
| 6,779,223 B1 | 8/2004 | Roekens |
| 7,293,321 B2 | 11/2007 | Breesch |
| 7,523,520 B2 | 4/2009 | Breesch |
| 7,607,194 B2 | 10/2009 | Weber et al. |
| 7,716,780 B2 | 5/2010 | Scholl et al. |
| 7,937,798 B2 | 5/2011 | Fink et al. |
| 8,220,106 B2 | 7/2012 | Fink et al. |
| 9,162,650 B2 | 10/2015 | Fink et al. |
| 9,499,132 B2 | 11/2016 | Line et al. |
| 9,751,503 B2 | 9/2017 | Fink et al. |
| 2004/0010882 A1 | 1/2004 | Breesch |
| 2004/0211021 A1 | 10/2004 | Weber et al. |
| 2005/0177970 A1 | 8/2005 | Scholl et al. |
| 2008/0034530 A1 | 2/2008 | Breesch |
| 2009/0172909 A1 | 7/2009 | Breesch |

FOREIGN PATENT DOCUMENTS

| | | |
|---|---|---|
| DE | 3416505 | 11/1985 |
| DE | 3709915 | 10/1998 |
| DE | 199 41 459 | 5/2001 |
| DE | 10130903 | 5/2002 |
| DE | 10065124 | 7/2002 |
| EP | 0236061 | 9/1987 |
| EP | 0304204 | 2/1989 |
| EP | 0895907 * | 2/1999 |
| FR | 1238655 | 8/1960 |
| FR | 1.308.353 | 9/1962 |
| FR | 2310243 | 12/1976 |
| FR | 2630070 | 10/1989 |
| FR | 2720990 | 12/1995 |
| GB | 615500 | 1/1949 |
| GB | 616577 | 1/1949 |
| GB | 626016 | 7/1949 |
| GB | 641730 | 8/1950 |
| GB | 645983 | 11/1950 |
| GB | 653420 | 5/1951 |
| GB | 675757 | 7/1952 |
| GB | 683854 | 12/1952 |
| GB | 685307 | 12/1952 |
| GB | 1546116 | 5/1979 |
| WO | 99/33687 | 7/1999 |
| WO | 00/50276 | 8/2000 |
| WO | WO 01/15946 | 3/2001 |
| WO | 02/34595 | 5/2002 |
| WO | 02/040328 | 5/2002 |
| WO | 0240329 | 5/2002 |
| WO | WO 02/34590 | 5/2002 |
| WO | WO 02/34591 | 5/2002 |
| WO | WO 02/34594 | 5/2002 |
| WO | WO 02/34596 | 5/2002 |
| WO | WO0240328 A1 | 5/2002 |
| WO | 03/080409 | 10/2003 |
| WO | 03/084789 | 10/2003 |

OTHER PUBLICATIONS

Machine language translation of description portion of WO 02/40328 published May 2002.

U.S. International Trade Commission; Complainant *Valeo North America, Inc.* et al. vs. Respondent *Trico Products Corporation*; Inv. No. 337-TA-928 and Inv. No. 337-TA-937; "Initial Determination on Violation of Section 337 and Recommended Determination on

(56) References Cited

OTHER PUBLICATIONS

Remedy and Bond"; Oct. 22, 2015; (23) pp. i-iv, 61-78 (discussing validity).

U.S. International Trade Commission; Complainant *Valeo North America, Inc.* et al. vs. Respondent *Trico Products Corporation*; Inv. No. 337-TA-928 and Inv. No. 337-TA-937; "Notice of a Commission Determination to Review in Part and, on Review, to Reverse in Part and to Vacate in Part a Final Initial Determination Finding a Violation of Section 337, and to Remand the Investigation in Part to the Administrative Law Judge"; Issued: Dec. 21, 2015; (5) pp.

U.S. International Trade Commission; Complainant *Valeo North America, Inc.* et al. vs. Respondent *Trico Products Corporation*; Inv. No. 337-TA-928 and Inv. No. 337-TA-937; "Remand Order"; Dec. 21, 2015; (5) pp.

Machine Translation of description portion of German publication 10130903, published May 2002.

\* cited by examiner

DEVICE FOR DETACHABLY LINKING A WIPER BLADE TO A DRIVEN WIPER ARM

CROSS-REFERENCE TO RELATED APPLICATIONS

This application is a continuation of U.S. application Ser. No. 15/948,375, filed Apr. 9, 2018, which is a continuation of Ser. No. 15/664,487, filed Jul. 31, 2017 (now U.S. Pat. No. 9,969,361), which is a continuation of U.S. application Ser. No. 15/332,736 filed Oct. 24, 2016 (now U.S. Pat. No. 9,751,503) which is a continuation of U.S. application Ser. No. 14/853,487, filed Sep. 14, 2015 (now U.S. Pat. No. 9,499,132), which is a continuation of U.S. application Ser. No. 13/531,788 filed Jun. 25, 2012 (now U.S. Pat. No. 9,162,650), which is a divisional application of U.S. application Ser. No. 12/944,776 filed Nov. 12, 2010 (now U.S. Pat. No. 8,220,106), which is a continuation of U.S. application Ser. No. 10/536,054 filed Jan. 19, 2006, (now U.S. Pat. No. 7,891,044), which is herein incorporated in its entirety by reference. U.S. Pat. No. 7,891,044 is the National Stage application of PCT International Application No. PCT/EP2003/013062 filed Nov. 21, 2003, which claims the benefit of priority from German Patent Application Nos. 102 54 978.8 filed Nov. 26, 2002 and 103 23 997.9 filed May 27, 2003.

The invention relates to a device and a method for releasably connecting a wiper blade to a drivable wiper arm, wherein the wiper blade comprises a wiper strip which faces the windscreen to be wiped, at least one strip-like elongate support element, a slide element which is connected to the support element, and a connecting element for connection to a coupling section of the wiper arm, which connecting element is mounted on the slide element in a manner such that it can pivot.

Such a device is known for example from WO 02/40328 A1. The device described therein, by means of which a flat wiper blade can be connected to the coupling section, has a large number of complex components which are difficult to manufacture. Moreover, the operation of connecting the coupling section of the wiper arm to the connecting element of the wiper blade is relatively complex and requires a certain amount of skill.

It is therefore an object of the present invention to propose a device for releasably connecting a wiper blade to a drivable wiper arm, in which the operation of connecting the connecting element to the coupling section can be carried out in a simple manner. Moreover, it is to be ensured that the coupling section is joined in a permanently secure manner to the connecting section, wherein the wiper blade can nevertheless be released from the wiper arm in a simple manner.

According to the invention, this object is achieved by a device of the type described above in that the coupling section has a tongue-like insertion section, in that the connecting-element has a seat for the insertion section, and in that the coupling section and the connecting element have securing sections for providing a mutual permanent connection, wherein, in order to reach a preassembly position in which the longitudinal axis of the wiper arm and the longitudinal axis of the connecting element enclose an angle a in the range from approximately 10° to 100°, the insertion section can be inserted in a substantially rectilinear manner into the seat, and wherein, in order to reach a final assembly position, the wiper arm and the connecting section can be pivoted onto one another about the insertion section/seat contact area until the securing sections allow a permanent mutual connection.

The invention has the advantage that only two steps which are simple to carry out are required in order to connect the wiper blade to the wiper arm, namely firstly rectilinear insertion of the insertion section into the seat provided on the connecting element, and pivoting of the coupling section or of the wiper arm and of the connecting element onto one another.

Moreover, such a device has the advantage that it is of a very flat and very narrow design. On the one hand, wind noise is minimized as a result. On the other hand, the view of the vehicle driver is only slightly impaired by the wiper blade and the wiper arm. Furthermore, force introduction preferably takes place over the longitudinal axis of the wiper blade, substantially perpendicular to the windscreen to be wiped, and as a result the occurrence of tilting moments is suppressed.

Preferably, the insertion direction for reaching the preassembly position lies in the plane of pivoting for reaching the final assembly position. This has the advantage that the two movements lie in one plane, and as a result the assembly operation is simplified.

One embodiment of the invention is characterized in that the coupling section is designed to be U-shaped in cross section and comprises a back and two legs, wherein the insertion section is designed in a hook-like manner and is arranged in a stand-alone manner on the back of the coupling section.

The coupling section, which is designed to be U-shaped in cross section, advantageously engages over the connecting element at least in part in the final assembly position. As a result, transverse forces acting on the connecting element can be absorbed by the legs of the coupling section.

The insertion section is preferably designed such that it is arc-shaped at the free end, in the direction of the extension of the wiper arm and in side view in the direction of the windscreen to be wiped, in such a manner that it does not protrude beyond the back. This has the advantage that the insertion section, in the final assembly position, does not protrude in a disruptive manner beyond the back of the coupling section. Given a suitably designed connecting element, the insertion section is not visible in the final assembly position.

It is advantageous if the region of the connecting element which cooperates with the insertion section and adjoins the insertion opening is designed to be complementary to the insertion section. In this way it can be ensured, in the final assembly position, that the insertion section bears reliably against the complementarily designed region of the connecting element.

A further embodiment of the invention is obtained when the region of the connecting element and of the insertion section which cooperates with the insertion section is designed to be arc-shaped, and in particular shaped like a segment of a circle, in longitudinal section. When the coupling section and the connecting element are pivoted onto one another in the final assembly position, this ensures that during the pivoting movement the insertion section bears with a substantial part of its surface against the region of the connecting element which cooperates with the insertion section. This ensures reliable guidance when assembling the device from the preassembly position to the final assembly position. Stress peaks are avoided on account of the large-surface bearing.

One further embodiment is obtained when the connecting element is designed to be U-shaped in cross section and comprises a back and two legs. On account of the U-shaped design of the connecting element, a spoiler section of the wiper strip which faces away from the windscreen to be wiped can extend between the two legs of the connecting element in the longitudinal direction of the wiper blade. Furthermore, the connecting element can advantageously be coupled at the legs to the slide.

Advantageously, the insertion opening is designed as a cut-out on the back. This has the advantage that the insertion opening can be clearly seen on the wiper blade in plan view, as a result of which insertion of the insertion section into the insertion opening is simplified.

According to the invention, it is furthermore conceivable that, in the final assembly position, the coupling section covers the connecting element at least in part. In the state mounted on the wiper arm, the inner sides of the legs of the U-shaped coupling section then preferably bear against the outer sides of the legs of the U-shaped connecting element. The outer side of the back of the connecting element preferably bears against the inner side of the back of the coupling section.

A further advantageous embodiment of the invention is obtained when the securing sections are designed as locking sections. When the coupling section and the connecting element are pivoted onto one another, the locking sections advantageously lock with one another in the final assembly position.

It may be provided that the connecting element has, on its side facing away from the insertion opening in the longitudinal direction, on the legs, in each case a locking tongue which extends in the longitudinal direction and is elastically flexible in the transverse direction, which locking tongues cooperate with locking edges provided on the legs of the coupling section.

In order to ensure secure locking, it may advantageously be provided that the locking edges of the locking tongues and the locking edges of the legs enclose an acute angle, in particular an angle in the range from approximately 30° to 80°, with the longitudinal axis of the wiper blade in the final assembly position.

In order to release the locking connection, and thus to release the wiper blade from the wiper arm, in a further embodiment of the invention it may be provided that actuating sections are provided on the free ends of the locking tongues. The actuating sections are designed in such a way that the locking tongues can be pressed towards one another, as a result of which the locking edges of the locking tongues can come out of engagement with the locking edges on the legs of the coupling section.

In order to allow easier locking, it is advantageously provided that the sides of the locking tongues which face the back of the coupling section and meet the legs of the coupling section when pivoted into the final assembly position are bevelled.

Easier locking is also assisted if the sides of the legs of the coupling section which face the windscreen and which are met by the facing sides of the locking sections when pivoted into the final assembly position are bevelled. Shortly prior to reaching the final assembly position, the bevelled sides of the locking tongues consequently cooperate with the bevelled sides of the legs of the coupling section in such a way that the locking tongues are pivoted out in directions towards one another. In the final assembly position, the locking tongues snap behind the locking edges of the coupling section in directions facing away from one another.

In order to prevent a wiper blade from being arranged the wrong way round on a wiper arm, the coupling section may have a suitable coding. Incorrect assembly of the wiper blade, for example on the incorrect wiper arm, is thus prevented. A coding may be produced for example by a suitable bezel on the coupling section and by a suitable web on the connecting element which cooperates with the bezel.

A further advantageous embodiment of the invention is obtained when the legs of the connecting element are designed as double-walled legs which are slightly elastically flexible in the transverse direction. Such double-walled legs have a better friction behaviour with respect to the slide element against which they are pivotably arranged. Advantageously, the connecting element has, between the legs, a hinge pin which is mounted in a hole on the slide element for the pivotable arrangement of the connecting element.

Another embodiment of the invention provides that the slide element has a bearing bolt or alternatively two hinge pins which project with their ends from the slide element and on which the connecting element is pivotably mounted by bearing holes in its legs, which bearing holes are designed in a corresponding manner and are arranged so as to be aligned. In this case, the bearing bolt is or the bearing pins are connected fixedly against rotation to the slide element, and the connecting element is mounted on the slide element in a manner such that it can rotate or pivot. When a wiper blade is replaced, therefore, the entire bearing device is exchanged.

According to a further embodiment of the invention, the bearing holes provided in the legs of the connecting element are opened above in each case a slot towards the edge, which slot runs radially with respect to the bearing hole. This may advantageously be used to simplify the assembly of the individual parts.

According to another embodiment, if the slot in each case runs from the bearing hole to the edge of the leg which lies opposite the back of the connecting element, the risk of the bearing bolt or bearing pin undesirably sliding out of the bearing hole is small.

One further advantageous embodiment provides that in each case the slot expands from the bearing hole towards the edge of the leg, wherein the narrowest point of the slot is smaller than the diameter of the bearing bolt or the alternative bearing pins. This embodiment allows simplification of assembly and disassembly. The bearing bolt or bearing pins can be pressed in radially through the slot in the manner of a locking connection, negotiating the narrow point. Likewise, the bearing bolt or bearing pins can also be removed in the opposite direction, again negotiating the narrow point. To this end, it may be necessary for the connecting element to be made of a suitable plastics material which allows the narrow point of the slot to be negotiated by the bearing bolt or bearing pins. The slide element and/or the bearing bolt or the bearing pins may be made of metal or likewise made of a suitable plastics material.

A further, advantageous embodiment of the invention provides that the legs of the connecting element have stud-like raised areas on the side facing the windscreen. These raised areas serve for support on either the wiper rubber or the support element, as a result of which easier assembly and disassembly of the wiper blade is made possible.

The coupling section and the connecting element are preferably designed in such a way that, in the final assembly position, they have a substantially closed and substantially smooth surface. To this end, the sections of the connecting element which are covered by the coupling section may lie deeper than the sections of the connecting element which are visible in the final assembly position, the difference in depth being the wall thickness of the coupling section.

Further advantageous refinements are provided in order to improve the aerodynamic behavior of the wiper arm/wiper blade combination, particularly at high travelling speeds or airflow velocities, and thus to counteract in particular the known effect of lifting of the wiper blade connected to the wiper arm off the windscreen to be wiped.

By virtue of the measure that the coupling section of the wiper arm has at least one opening suitable for air to flow through, a dynamic pressure which arises below the U-shape of the coupling section is substantially broken down. As a result, the lifting force on the wiper arm is reduced.

It is particularly advantageous to provide the at least one opening in the back of the coupling section. However, an improvement is also possible if one or more airflow openings are placed in the legs of the coupling section, in particular in the lee-side leg. The maximum effect can probably be achieved by a combination of the individual possibilities.

Another embodiment provides that at least one spoiler-like air guide means is provided on the coupling section of the wiper arm. In this way, the incoming air can be guided in such a way that the effect of the wiper blade or wiper arm being lifted off the windscreen is counteracted. It is advantageous in this connection for the at least one air guide means to be arranged on the back of the coupling section. A spoiler acts particularly effectively at this location.

The advantages of an embodiment, according to which the air guide means is formed by a section cut free from the back of the coupling section and bent upwards in a spoiler-like manner, are to be seen in the combination of the effects of the spoiler and of the airflow opening formed in this way. The pressing force is thus directly increased and at the same time the dynamic pressure inside the coupling section is reduced. Moreover, an air guide means produced in this way is particularly cost-effective.

A further advantageous embodiment provides that at least one spoiler-like air guide means which is preferably made in one piece with the connecting element is arranged on the back of the connecting element, and that this at least one air guide means protrudes through a, preferably corresponding, opening in the back of the coupling section. Since the connecting element is advantageously made of plastics material, a very large number of design possibilities are provided for the shape of the spoiler-like air guide means with regard to particularly favourable fluidic properties.

The object mentioned in the introduction is also achieved by a method of assembling a device according to the invention, which method is characterized in that, in order to reach a preassembly position in which the longitudinal axis of the wiper arm and the longitudinal axis of the connecting element enclose an angle a in the range from approximately 10° to 100°, the insertion section is inserted in a substantially rectilinear manner into the seat, and in that, in order to reach a final assembly position, the wiper arm and the connecting section can be pivoted onto one another about the insertion section/seat contact area until the securing sections enter into a permanent mutual connection.

Further details and advantages of the invention can be found in the following description in which the invention is described and explained in more detail with reference to examples of embodiments shown in the drawings.

Figure 1:
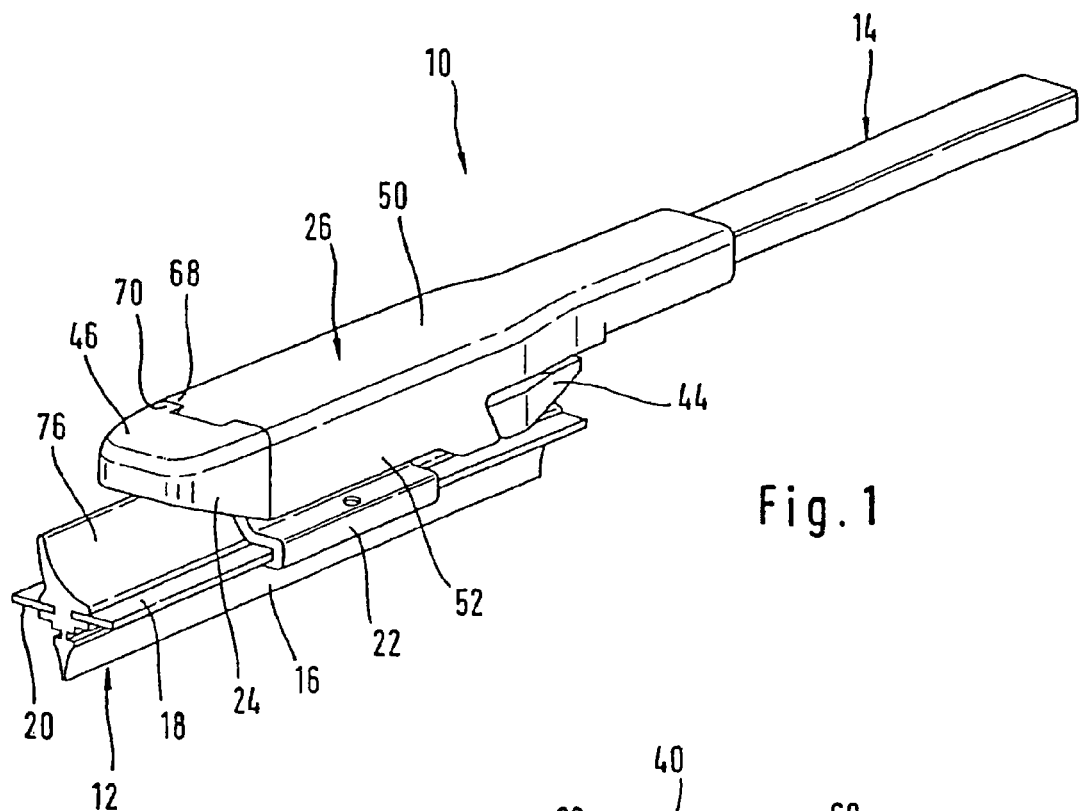
FIG. 1 shows a device according to the invention in a perspective view.

FIG. 1 shows a device 10 according to the invention for releasably connecting a wiper blade 12, shown in part, to a drivable wiper arm 14 which is likewise shown in part. The wiper blade 12 has a wiper strip 16 which faces the windscreen to be wiped (not shown) and comprises two strip-like elongate support elements 18, 20, a slide element 22 which is connected to the support elements 18, 20, and a connecting element 24 which is arranged on the slide element 22 in a manner such that it can pivot. The connecting element 24 serves for connection to a coupling section 26 on the wiper arm 14.

Figure 4:
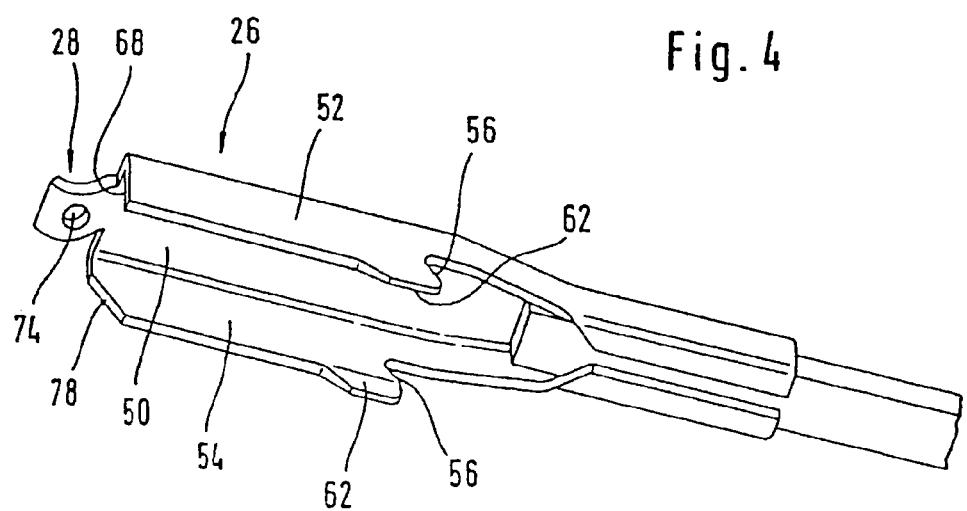
FIG. 4 shows a view from below of the coupling section shown in FIG. 1.
Figure 6:
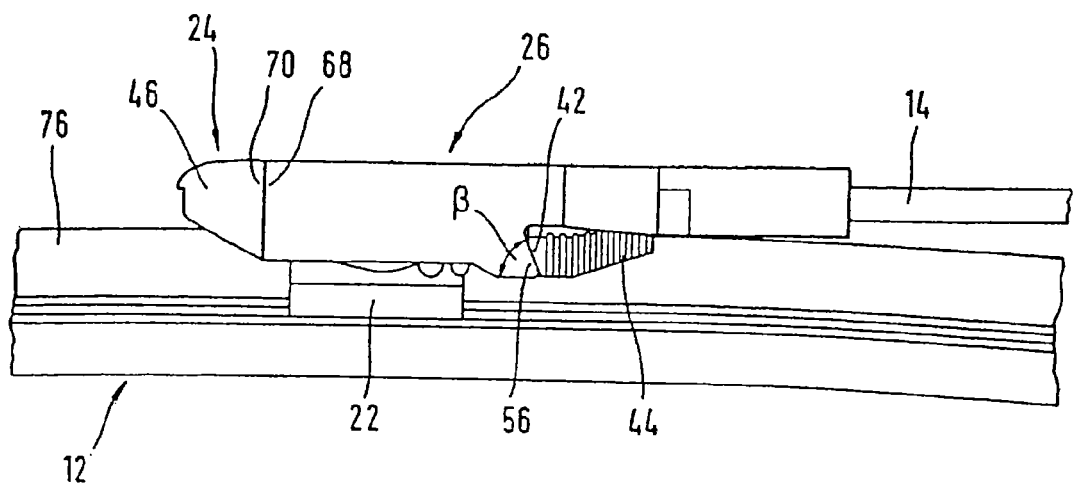
FIG. 6 shows a partial section through the device of FIG. 5 in the final assembly position.

The coupling section 26 has, as can be seen in particular in FIG. 4, a tongue-like insertion section 28 which, in the final assembly position shown in FIGS. 1 and 6, engages in a seat 30 which can be clearly seen in FIG. 21 The connecting element 24, which like the coupling section 26 is U-shaped in cross section, has a back 32 and two legs 34. The seat 30 is provided in the back 32 of the connecting element 24. A bearing hole 36 for a bearing bolt 38, which bearing hole extends in the transverse direction, is provided on the legs 34 of the connecting element 24. On account of the bearing hole 36, and the bearing bolt 38, a pivoting arrangement of the connecting element 24 with respect to the slide element 22 is obtained. In order to achieve a certain flexibility of the legs 34 while having sufficient stiffness, the legs 34 are designed to be double-walled.

Figure 2:
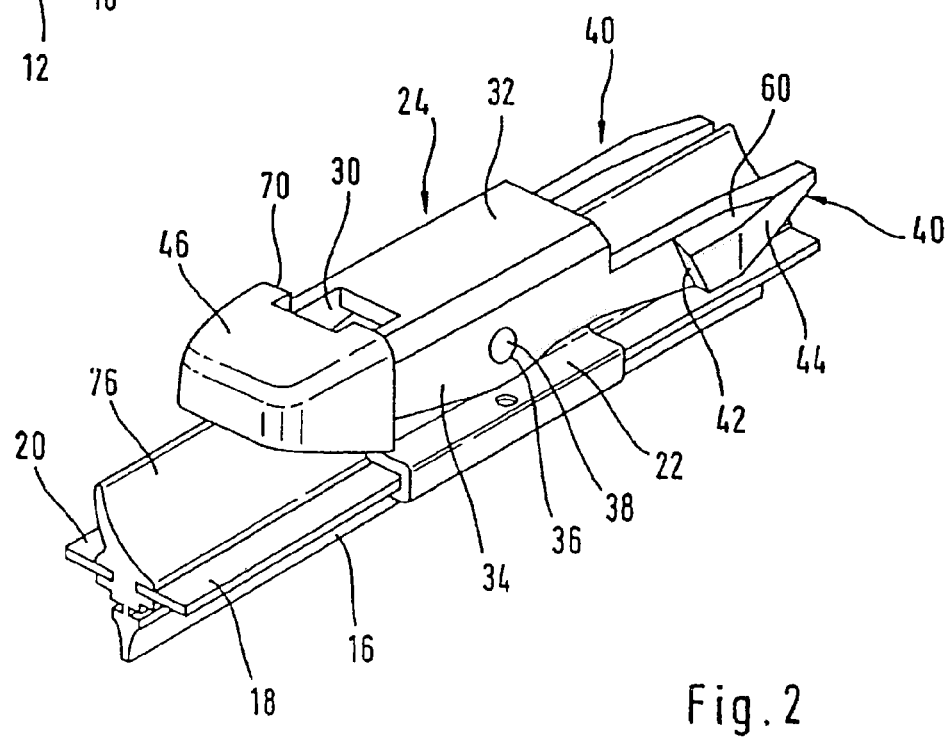
FIG. 2 shows the device of FIG. 1 without the wiper arm.

As can likewise be seen from FIG. 2, the connecting element 24 has, on its side facing away from the insertion opening 30 in the longitudinal direction, on the legs 34, in each case a locking tongue 40 which extends in the longitudinal direction and is elastically flexible in the transverse direction. The locking tongues 40 each comprise a locking edge 42 and an actuating section 44. The region of the connecting element 24 which is covered by the coupling section 26 in the final assembly position is set back from the other regions of the connecting element 24 which are formed essentially by the two actuating sections 44 and a head section 46 which lies in the axial extension of the coupling section. As a result, in the final assembly position, the coupling section 26 and the connecting element 24 form a substantially closed and substantially smooth surface.

Figure 3:
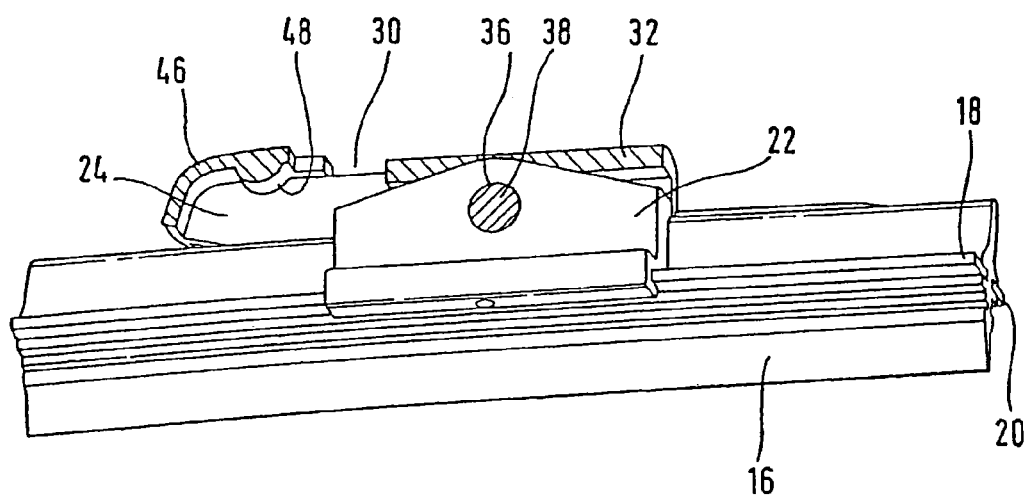
FIG. 3 shows a partial section through FIG. 2.

As can be seen from FIG. 3, the region 48 which cooperates with the insertion section 28 and adjoins the insertion opening 30 is designed to be complementary to the insertion section 28. As can be seen from FIGS. 4 and 5, the insertion section 28 is designed in an arc-shaped manner in the direction of the extension of the wiper arm 14 and in side view in the direction of the windscreen to be wiped. Correspondingly, as can be seen from FIGS. 3 and 5, the region 48 is likewise designed to be arc-shaped, in particular in the shape of a segment of a circle.

Figure 5:
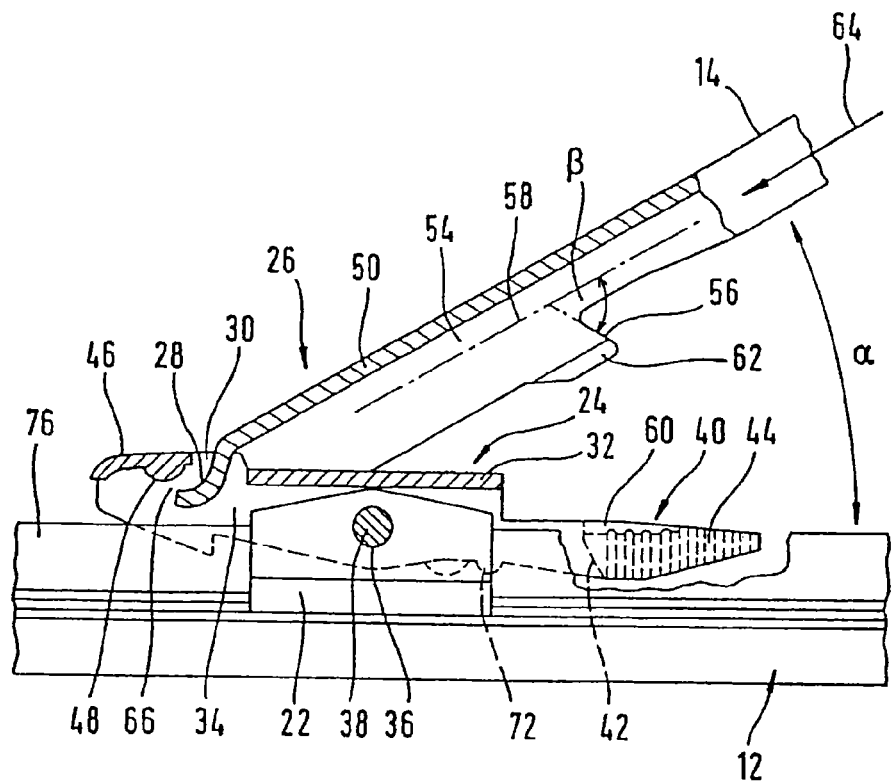
FIG. 5 shows a partial section through the device of FIG. 1 in a preassembly position.

It can be seen from FIG. 4 that the coupling section is designed in a U-shaped manner in cross section and has a back 50 and legs 52, 54 which adjoin the back. The insertion section 28 is in this case arranged in a stand-alone manner in, the extension of the back 50. Provided on the legs 52, 54 are locking edges 56 which enclose an angle R of approximately 70° with the longitudinal axis 58 of the wiper arm 14 (FIGS. 5 and 6). The locking edges 42 of the locking tongues 40 enclose a corresponding angle R. In the final assembly position shown in FIG. 6, the locking edges 42 of the locking tongues 40 bear against the locking edges 56 of the legs 52, 54 of the coupling section 26.

It can be seen from FIGS. 2 and 5 that the sides 60 of the locking tongues 40 which face the back 50 of the coupling section 26 are slightly bevelled. In a corresponding manner, the sides 62 of the legs of the coupling section 26 which face the windscreen and cooperate with the sides 60 of the coupling section 26 when pivoted into the final assembly position are also slightly bevelled.

For assembly of the coupling section 26 to the connecting element 24, in order to reach a preassembly position which is shown in FIG. 5, the insertion section 28 is inserted into the seat 30 in a substantially rectilinear manner in the direction of the arrow 64. In this preassembly position, the longitudinal axis of the wiper arm 14 and the longitudinal axis of the connecting element 24 or of the wiper blade 12 enclose an angle a which may lie in the range from approximately 10 to 100°. In the example of embodiment shown in FIG. 5, the angle a has a value of approximately 40°. In order to reach the final assembly position, which is shown in FIG. 1 and FIG. 6, the wiper arm 14 and the connecting section 24 are pivoted onto one another about the contact area 66 in which the insertion section 28 bears against the region 48 of the seat 30. On account of the complementary design of the insertion section 28 and the region 48, the pivoting operation is carried out to a limited extent. Shortly prior to reaching the final assembly position, the bevelled sides 62 of the coupling section 26 and the correspondingly bevelled sides 60 of the locking tongues 40 meet one another in such a way that the locking tongues 40 are pivoted elastically in a direction facing one another. Upon reaching the final assembly position, the locking tongues 40 snap behind the locking edges 56 of the legs 52, 54 of the coupling section 26 in a direction facing away from one another. As a result, the coupling section 26 is permanently held on the connecting element 24 in the final assembly position. In the final assembly position, the coupling section 28 bears against the region 48 of the connecting element 24 over a large part of its surface. Furthermore, the end side 68 of the coupling section 26 which faces the head area 46 of the connecting element 26 bears against a bearing edge 70 of the connecting element which corresponds thereto.

On account of the locking edges 42, 56 which are not perpendicular to the longitudinal axis of the wiper blade but rather enclose an acute angle p with the longitudinal axis, in the assembled state the coupling section 26 is acted upon in the direction of the head section 46. As a result, a play-free connection is obtained in the axial direction. Moreover, by virtue of the obliquely arranged locking edges 42, 56, the coupling section 26 is acted upon in the direction of the wiper blade 12, as a result of which a play-free connection is produced in the direction perpendicular to the wiper blade. The insertion section 28 in this case bears against the contact region 48 of the connecting element 24 with slight prestress.

In order to release the connection, the actuating sections 44 are pressed towards one another. As a result, the locking edges 42 of the locking tongues 40 come out of the engagement region of the locking edges 56 of the coupling section 26. Since the actuating sections are arranged opposite one another, the actuating sections 44 can be pressed together by a simple hand grip, using one hand. The coupling section 26 is then pivoted away from the connecting element 24 until the preassembly position reached in FIG. 5 is almost reached. The insertion section 28 is then moved out of the seat 30 in the direction counter to the arrow 64.

As can be clearly seen in FIG. 5, it may be provided that the legs 34 of the connecting element have stub-like raised areas 72 on the side facing the windscreen. These raised areas serve for support on the slide element 22. The raised areas 22 restrict the pivoting range of the connecting element 24 with respect to the slide element 22. As a result, easier assembly and disassembly of the wiper blade 12 from the wiper arm 14 is possible.

In the bent region of the insertion section 28, a material cut-out in the form of a cylindrical hole 74 is provided.

In order to prevent it from being possible for the wiper blade, which has a spoiler-like projection 76 on its side facing away from the wiper strip 16, to be mounted on the incorrect wiper arm, a coding may be provided on the connecting element 24 and on the coupling section 26. Such a coding may be formed for example by a bevelled corner 78 on the leg 54 of the coupling section 26, as shown in a corresponding manner in FIG. 4. The bevelled corner 78 may in this case correspond to a material deposit at the corresponding location on the connecting element 24, which material deposit is designed in a complementary manner and is not shown in the figures. Since only one of two wiper blades, the respective right-hand or left-hand wiper blade, has a corresponding material deposit on the connecting element, a clear assignment of the right-hand or left-hand wiper blade to the right-hand or left-hand wiper arm is ensured.

Figure 7:
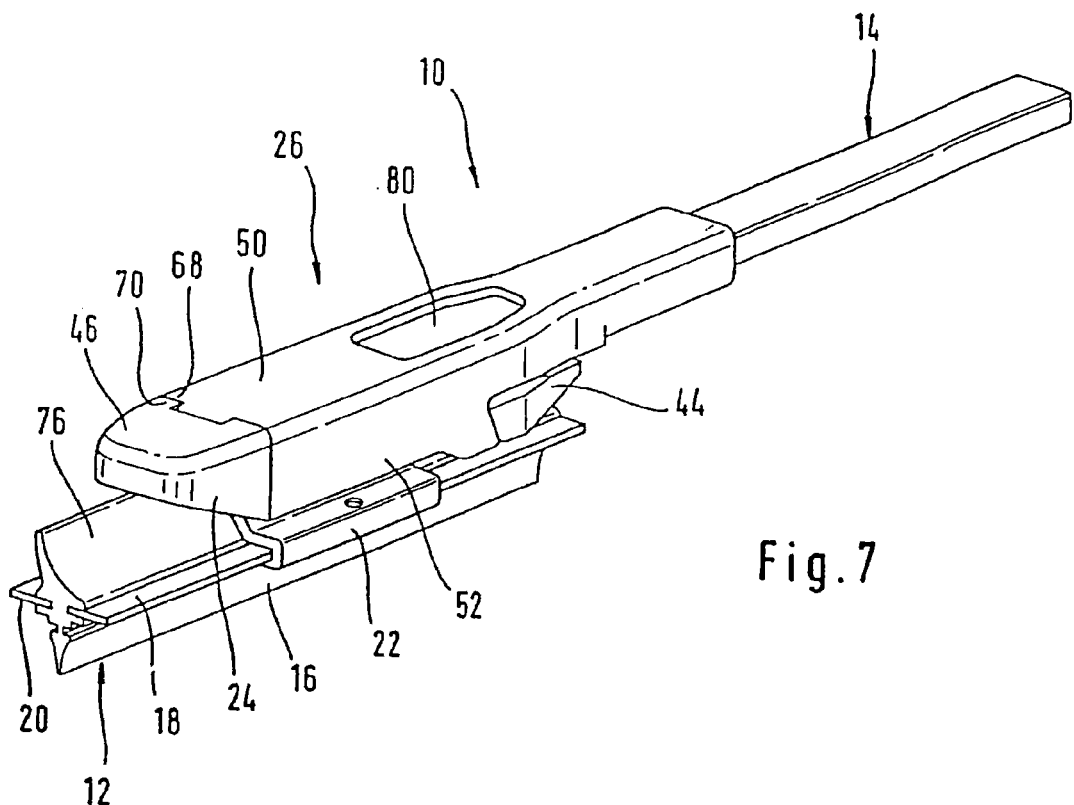
FIG. 7 shows another embodiment of a device according to the invention in a perspective view.

For the example of embodiment shown in FIG. 7, in general the same description as above in respect of the first example of embodiment shown in FIGS. 1 to 6 applies. The same references have thus been used in FIG. 7 as in FIG. 1.

The essential difference of the example of embodiment shown in FIG. 7 is that an opening 80 is additionally provided in the back 50 of the coupling section 26 belonging to the wiper arm 14. This opening 80 makes it possible for air flowing below the U-shape of the coupling section to leave the space formed below the U-shape on a relatively short path by flowing through the opening 80. In this way, the dynamic pressure below the coupling section 26 is reduced compared to an embodiment without the opening 80, and this leads to a comparative reduction in the lifting force of the wiper arm 14 as air flows through.

Instead of the one opening 80, it would also be possible for a number of openings 80 to be provided in the coupling section 26, wherein one or more openings 80 may also be made in one of the two legs 52, 54 or in both legs 52, 54. The size, shape and position of the one or more openings 80 should be optimized with regard to as considerable an effect as possible in a manner depending on the geometric conditions of the individual components of the device 10 and of the device 10 as a whole. Likewise, the shape and size of the one or more openings 80 may be adapted to the design of the coupling section 26.

Figure 8:
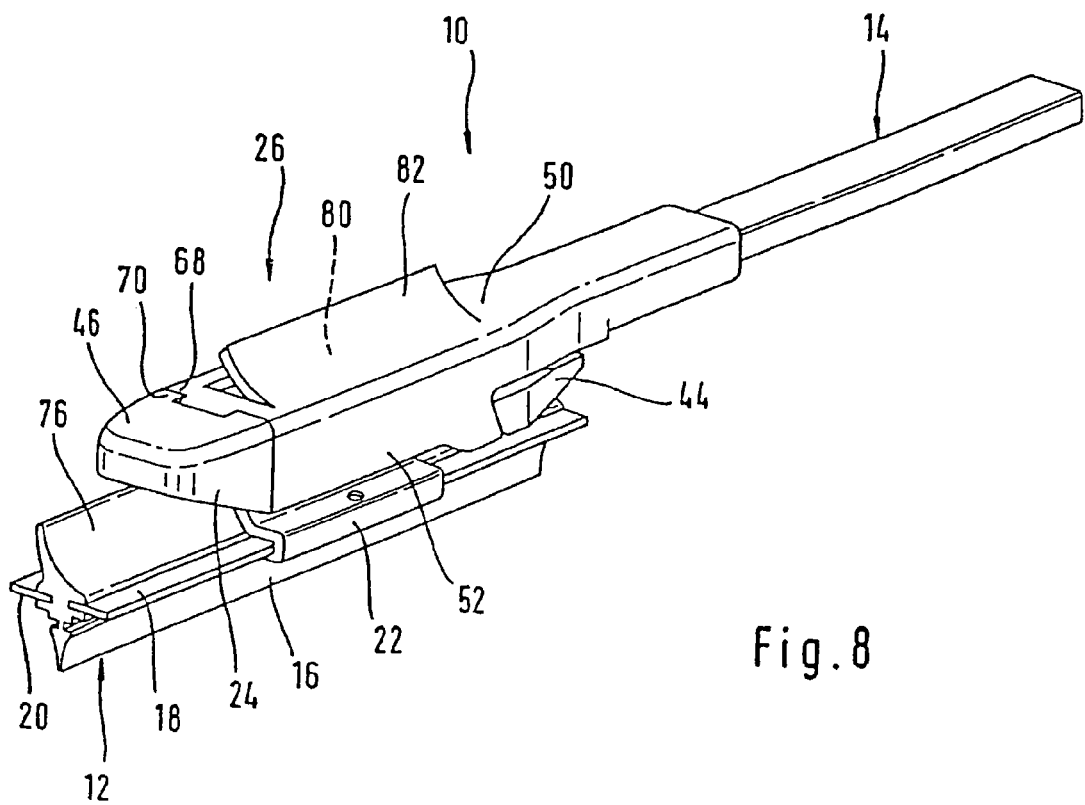
FIG. 8 shows a further embodiment of a device according to the invention in a perspective view.

Also for the further example of embodiment shown in FIG. 8, the same description as that given above in respect of the first example of embodiment shown in FIGS. 1 to 6 applies.

The essential difference of the example of embodiment shown in FIG. 8 is that a spoiler-like air guide means 82 is formed on the back 50 of the coupling section 26. In order to produce the air guide means 82, a more or less rectangular section which is oriented in the longitudinal direction of the coupling section 26 has been cut free from or punched out of the back 50 of the coupling section 26, at its two narrow sides and on one longitudinal side, and bent upwards out of the plane of the back 50. In this case, the air guide means 82 may be given a rounded, wing-like shape. The air guide means 82 is connected on its longitudinal side facing the incoming air to the back 50. By virtue of the bending-out operation, the opening 80 in the back 50 is made at the same time behind the air guide means 82, which opening can be flowed through by a stream of air. In FIG. 8, the reference line belonging to reference 80 is shown in dashed line because the view of the opening 80 is hidden by the air guide means 82 in this perspective view. The air guide means 82 and the opening 80 may be produced from steel sheet as a punched and bent part in a cost-effective manner by punching and bending during the process of manufacturing the coupling section.

The aerodynamic advantages of such a design are on the one hand the pressing force produced by the air guide means, which pressing force acts on the wiper arm 14, and on the other hand the reduction in the dynamic pressure below the U-shape of the coupling section 26.

Figure 9:
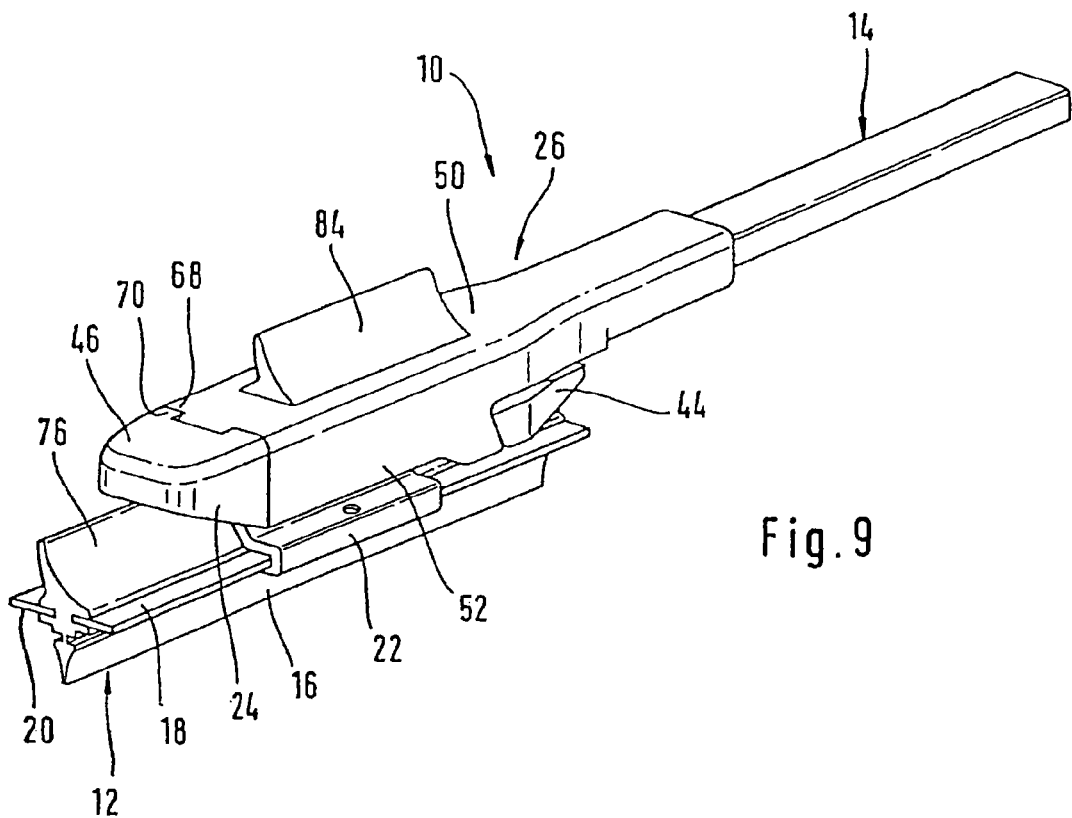
FIG. 9 shows a final embodiment of a device according to the invention in a perspective view.
Figure 10:
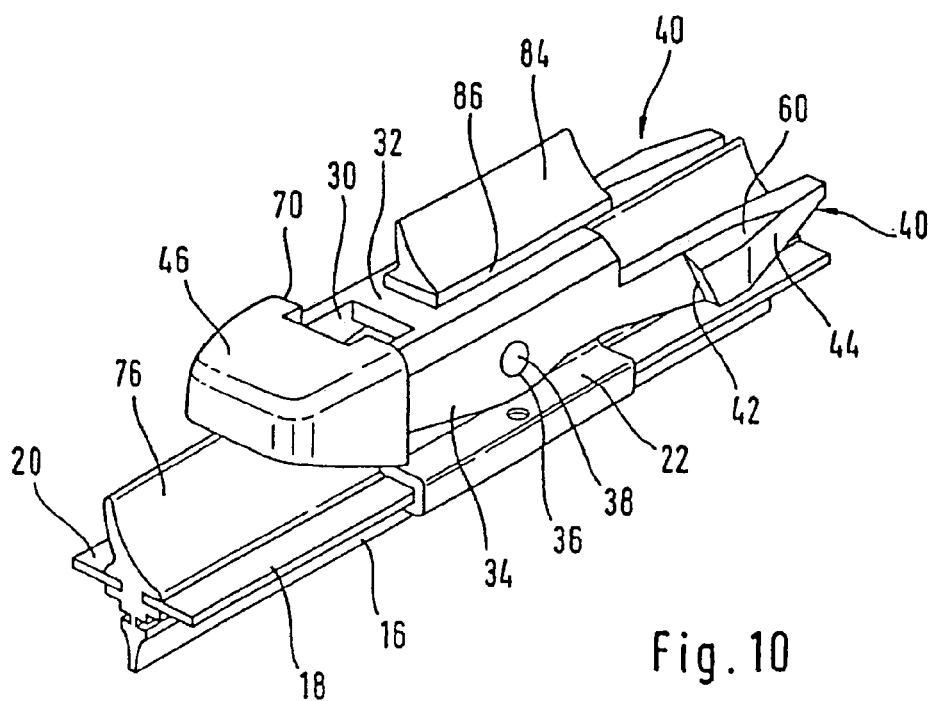
FIG. 10 shows the device of FIG. 9 without the wiper arm.

The special feature of the example of embodiment shown in FIGS. 9 and 10 is that an opening is provided in the back 50 of the coupling section 26 and that a spoiler-like air guide means 84 arranged on the back 32 of the connecting element 24 passes through this opening to the top side of the coupling section 26. When air flows across the air guide means 84, the pressing force of the wiper arm 14 is increased and the lifting force is reduced.

In FIG. 9, it can be seen that the shape and the size of the opening in the coupling section 26 and the base area of the air guide means 84 are adapted to one another. Moreover, the air guide means 84 is connected to the back 32 of the connecting element 24 via a pedestal 86. The height of the pedestal 86 corresponds to the wall thickness of the back 50 of the coupling section 26, so that the top side of the back 50 adjoins the air guide means 84 at least virtually free of any clearance or shoulder. As a result, the aerodynamics are improved and airflow noises are reduced.

Unlike the diagram in FIGS. 9 and 10, the opening in the back 50 of the coupling section 26 may advantageously also be greater than the base area of the air guide means 84 or the pedestal 86 thereof. In this case, only part of the opening would be filled by the air guide means 84. The part of the opening which is not filled thus acts as an airflow opening, and as a result the dynamic pressure below the U-shape of the coupling section 26 is in turn reduced. This embodiment is not shown in the drawing.

Another embodiment which is not shown in the drawing consists in that, in a device as shown in FIGS. 9 and 10, additionally at least one opening is provided in the back and/or in at least one of the legs 52, 54 for reducing the dynamic pressure below the U-shape of the coupling section 26.

Figure 11:
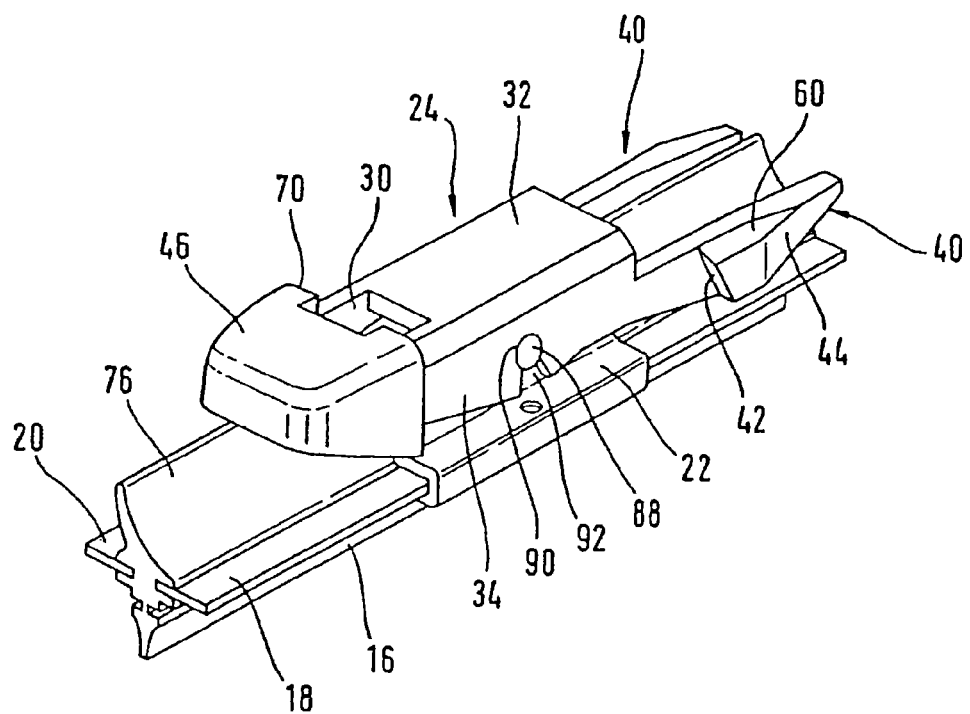
FIG. 11 shows another embodiment of a device according to the invention without the wiper arm.

A final example of embodiment is shown in FIG. 11. This example of embodiment corresponds in a very large number of features to the embodiment shown in FIG. 2, which is why the fundamental design will not be repeated here and the same reference numerals are used for identical parts and elements.

In the example of embodiment shown in FIG. 11, the slide element 22 has two bearing pins 88 which are arranged so as to be aligned with one another and which project from the slide element 22 transversely with respect to the longitudinal direction of the wiper blade 12. The bearing pins 88, only one of which can be seen in FIG. 11 on account of the perspective view, are made in one piece with the slide element 22. The slide element 22 will advantageously be manufactured as a whole as a diecast metal part or as an injection-moulded plastic part.

Bearing holes 90 which are aligned with one another are formed in the two legs 34 of the connecting element 24, said connecting element having essentially the shape of a U in cross section, once again only one of the bearing holes 90 being visible in FIG. 11 on account of the perspective view. The bearing holes 90 are adapted to the bearing pins 88 in such a way that pivoting of the slide element 22 relative to the connecting element 24 can take place in as play-free a manner as possible. One essential difference compared to the embodiment shown in FIG. 2 is that the bearing holes 90 are each opened radially above a slot 92 which runs from the bearing hole 90 towards the lower edge of the leg 34, that is to say the edge opposite the back 32 of the connecting element 24. The slot 92 expands from the edge of the bearing hole 90 towards the edge of the leg 34. The narrow point of the slot 92 is in this case narrower than the diameter of the respective bearing pin 88. Upon assembly or disassembly of the slide element 22 and the connecting element 24, the bearing pins 88 are pressed radially into the bearing holes 90 or out of the latter through the slots 92 in the manner of a locking connection, negotiating the narrow point. As a result, these processes are considerably simplified, and moreover a sufficiently reliable seating or holding of the bearing pins 88 in the bearing holes 90 is ensured.

Usually, the connection of a wiper blade 12 provided with such a slide element 22 and such a connecting element 24 to a wiper arm 14 or to the coupling section 26 of a wiper arm 14, and removal thereof in the opposite direction, take place in the same general manner, as has been described in connection with FIGS. 1 to 6. However, in the embodiment shown in FIG. 11, there is also the possibility firstly of attaching the connecting element 24, separated from the wiper blade 12, in this general way to the coupling section 26 of the wiper arm 14 and then mounting the slide element 22 connected to the wiper blade 12 on the connecting element 24 by pushing the bearing pins 88 radially through the slots 92 into the bearing holes 90. It is also conceivable to carry out a disassembly operation by reversing the sequence of these last-mentioned steps.

Devices for releasably connecting a wiper blade to a wiper arm which correspond to the examples of embodiments shown in FIGS. 1 to 10 are suitable in particular for use in wiper systems for front windscreens of vehicles, whereas the device corresponding to the example of embodiment shown in FIG. 11 is suitable in particular for use in wiper systems for rear windows of vehicles.

All of the features found in the description, the drawings and the claims may be essential to the invention both individually and in any desired combination with one another.

The invention claimed is:
1. A wiper blade assembly, comprising:
a wiper blade;
an element connected to the wiper blade; and
a connector to be coupled to said wiper blade via the element such that at least a pivotable portion of said connector and said wiper blade pivot relative to each other about a pivot, said pivot having a pivot axis extending through lateral side walls of said connector in a direction transverse to a longitudinal axis of said wiper blade;

wherein said connector has a region through which the pivot axis extends, a head section on a front side of the connector relative to the region, and at least one flexible tab extending to a rear side of the connector relative to said region, said flexible tab being positioned on a lateral side of said connector, the flexible tab having a receiving member extending laterally outward from the flexible tab to face toward the head section, wherein a top surface of said head section is sloped such that a distance from the longitudinal axis to the top surface of the head section decreases continuously from a back edge of the head section to a front of the head section, and wherein the element extends upward from the wiper blade and the element extends between the lateral side walls of the connector in the direction transverse to the longitudinal axis of the wiper blade when the connector is coupled to the wiper blade.

2. The wiper blade assembly according to claim 1, wherein the front of the head section includes a planar front face.

3. The wiper blade assembly according to claim 1, wherein the connector is open to a rear of the region such that no top surface extends above the flexible tab where the receiving member is located.

4. The wiper blade assembly according to claim 1, wherein the back edge of the head section is wider than the front of the head section.

5. The wiper blade assembly according to claim 1, wherein a bottom edge of each of the lateral side walls is closer to the longitudinal axis of the wiper blade than the pivot axis continuously along an entire length of the region.

6. The wiper blade assembly according to claim 5, wherein the lateral side walls are a widest part of the region.

7. The wiper blade assembly accordingly to claim 1, wherein the region has a constant width along an entire length of the region.

8. The wiper blade assembly accordingly to claim 1, wherein the flexible tab extends from the region in a direction parallel to the longitudinal axis.

9. A wiper blade assembly, comprising:
a wiper blade;
an element connected to the wiper blade; and
a connector to be coupled to said wiper blade via the element such that at least a pivotable portion of said connector and said wiper blade pivot relative to each other about a pivot, said pivot having a pivot axis extending through lateral side walls of said connector in a direction transverse to a longitudinal axis of said wiper blade;
wherein said connector has a region through which the pivot axis extends, a head section on a front side of the connector relative to the region, and at least one flexible tab extending to a rear side of the connector relative to said region, and said flexible tab being positioned on a lateral side of said connector, the flexible tab having a receiving member extending laterally outward from the flexible tab,
wherein a top surface of said head section is shaped such that a back edge of the head section is positioned further from the longitudinal axis than a front of the head section, and
wherein the element extends upward from the wiper blade and the element extends between the lateral side walls of the connector in the direction transverse to the longitudinal axis of the wiper blade when the connector is coupled to the wiper blade.

10. The wiper blade assembly according to claim 9, wherein the front of the head section includes a planar front face.

11. The wiper blade assembly according to claim 9, wherein the connector is open to a rear of the region such that no top surface extends above the flexible tab where the receiving member is located.

12. The wiper blade assembly according to claim 9, wherein the back edge of the head section is wider than the front border of the head section.

13. The wiper blade assembly according to claim 9, wherein a bottom edge of each of the lateral side walls is closer to the longitudinal axis of the wiper blade than the pivot axis continuously along an entire length of the region.

14. The wiper blade assembly according to claim 13, wherein the lateral side walls are a widest part of the region.

15. The wiper blade assembly accordingly to claim 9, wherein the region has a constant width along an entire length of the region.

16. The wiper blade assembly accordingly to claim 9, wherein the flexible tab extends from the region in a direction parallel to the longitudinal axis.

17. A wiper blade assembly, comprising:
a wiper blade;
an element connected to the wiper blade; and
a connector to be coupled to said wiper blade via the element such that at least a pivotable portion of said connector and said wiper blade pivot relative to each other about a pivot, said pivot having a pivot axis extending through lateral side walls of said connector in a direction transverse to a longitudinal axis of said wiper blade;
wherein said connector has a region through which the pivot axis extends, a head section on a front side of the connector relative to the region, and at least one flexible tab extending to a rear side of the connector relative to said region, said flexible tab being positioned on a lateral side of said connector, the flexible tab having a receiving member extending laterally outward from the flexible tab to face toward the head section;
wherein a top surface of said head section is shaped such that a back edge of the head section is positioned further from the longitudinal axis than a front of the head section,
wherein the front of the head section includes a planar front face, and
wherein the element extends upward from the wiper blade and the element extends between the lateral side walls of the connector in the direction transverse to the longitudinal axis of the wiper blade when the connector is coupled to the wiper blade.

18. The wiper blade assembly according to claim 17, wherein the connector is open to a rear of the region such that no top surface extends above the flexible tab where the receiving member is located.

19. The wiper blade assembly accordingly to claim 17, wherein the region has a constant width along an entire length of the region to a back edge of the region.

20. The wiper blade assembly accordingly to claim 17, wherein the flexible tab extends from the region in a direction parallel to the longitudinal axis.

\* \* \* \* \*